(12) United States Patent
Luo (10) Patent No.: US 10,301,098 B2
(45) Date of Patent: May 28, 2019

(54) THERMAL BAG

(71) Applicant: Binghua Luo, Fujian (CN)

(72) Inventor: Binghua Luo, Fujian (CN)

( * ) Notice: Subject to any disclaimer, the term of this patent is extended or adjusted under 35 U.S.C. 154(b) by 0 days.

(21) Appl. No.: 15/741,506

(22) PCT Filed: Jun. 26, 2017

(86) PCT No.: PCT/CN2017/090004
§ 371 (c)(1),
(2) Date: Jan. 3, 2018

(87) PCT Pub. No.: WO2018/024047
PCT Pub. Date: Feb. 8, 2018

(65) Prior Publication Data
US 2018/0370710 A1    Dec. 27, 2018

(30) Foreign Application Priority Data

Aug. 5, 2016  (CN) .......................... 2016 1 06387801
Aug. 5, 2016  (CN) .......................... 2017 1 02900874

(51) Int. Cl.
*B65D 81/18*  (2006.01)
*B65D 77/04*  (2006.01)
*B65D 81/38*  (2006.01)

(52) U.S. Cl.
CPC ......... *B65D 81/18* (2013.01); *B65D 77/0406* (2013.01); *B65D 81/3818* (2013.01); *B65D 81/3823* (2013.01); *B65D 2581/055* (2013.01)

(58) Field of Classification Search
CPC .......................... B65D 81/18; B65D 77/0406; B65D 81/3818; B65D 81/3823
USPC ............................................................ 383/110
See application file for complete search history.

(56) References Cited

U.S. PATENT DOCUMENTS

| | | | | |
|---|---|---|---|---|
| 1,753,813 | A * | 4/1930 | Washburn .......... | B65D 81/3886 383/110 |
| 1,949,677 | A * | 3/1934 | Crawford ........... | B65D 81/3886 215/12.1 |
| 2,289,254 | A * | 7/1942 | Eagles .................... | A45C 11/20 220/592.01 |
| 2,857,949 | A * | 10/1958 | Ziff ......................... | A45C 11/20 383/110 |
| 4,598,746 | A * | 7/1986 | Rabinowitz ............ | A45C 11/20 206/545 |
| 5,490,396 | A * | 2/1996 | Morris .................. | B65D 81/18 383/110 |
| 6,092,661 | A * | 7/2000 | Mogil .................. | A63B 55/408 150/106 |

(Continued)

*Primary Examiner* — Jes F Pascua (57) ABSTRACT

A thermal bag comprising a thermal bag body and a thermal bag cover. The bag cover is connected to the bag body via a connecting member in an openable manner. The bag body comprises an inner bag (2), and outer bag (3) and a thermal layer (5) between the outer bag and the inner bag. A receiving cavity is provided inside the inner bag for receiving articles to be kept warm or cold. An inner bag platform is provided corresponding to an upper portion of the thermal layer between an upper side of the inner bag and an inner side of the outer bag. An abutting platform is provided corresponding to the inner bag platform on the bag cover which abuts against the inner bag platform when the bag cover is closed.

12 Claims, 8 Drawing Sheets

(56) References Cited

U.S. PATENT DOCUMENTS

| | | | | |
|---|---|---|---|---|
| 6,237,776 B1* | 5/2001 | Mogil | ............... | A45C 3/00 |
| | | | | 150/106 |
| 6,439,389 B1* | 8/2002 | Mogil | ............... | A45C 3/00 |
| | | | | 206/217 |
| 7,162,890 B2* | 1/2007 | Mogil | ............... | A45C 11/20 |
| | | | | 62/457.7 |
| 7,669,436 B2* | 3/2010 | Mogil | ............... | A45C 11/20 |
| | | | | 62/457.7 |
| 7,841,207 B2* | 11/2010 | Mogil | ............... | A45C 11/20 |
| | | | | 62/457.1 |
| 7,988,006 B2* | 8/2011 | Mogil | ............... | A45C 11/20 |
| | | | | 220/23.86 |
| 8,061,159 B2* | 11/2011 | Mogil | ............... | A45C 11/20 |
| | | | | 62/457.1 |
| 8,857,654 B2* | 10/2014 | Mogil | ............... | A45C 11/20 |
| | | | | 220/592.01 |
| 8,899,071 B2* | 12/2014 | Mogil | ............... | A45C 11/20 |
| | | | | 62/371 |
| 9,854,886 B1* | 1/2018 | Xia | ............... | B65D 81/38 |
| 2005/0103044 A1* | 5/2005 | Mogil | ............... | A45C 11/20 |
| | | | | 62/457.7 |
| 2005/0205459 A1* | 9/2005 | Mogil | ............... | A45C 11/20 |
| | | | | 206/545 |
| 2008/0245096 A1* | 10/2008 | Hanson | ............... | A45C 11/20 |
| | | | | 62/457.2 |
| 2015/0225164 A1* | 8/2015 | Seiders | ............... | B65D 81/3858 |
| | | | | 220/592.25 |
| 2017/0210542 A1* | 7/2017 | Seiders | ............... | A45C 11/20 |

\* cited by examiner

THERMAL BAG

BACKGROUND OF THE INVENTION

Figure 1:
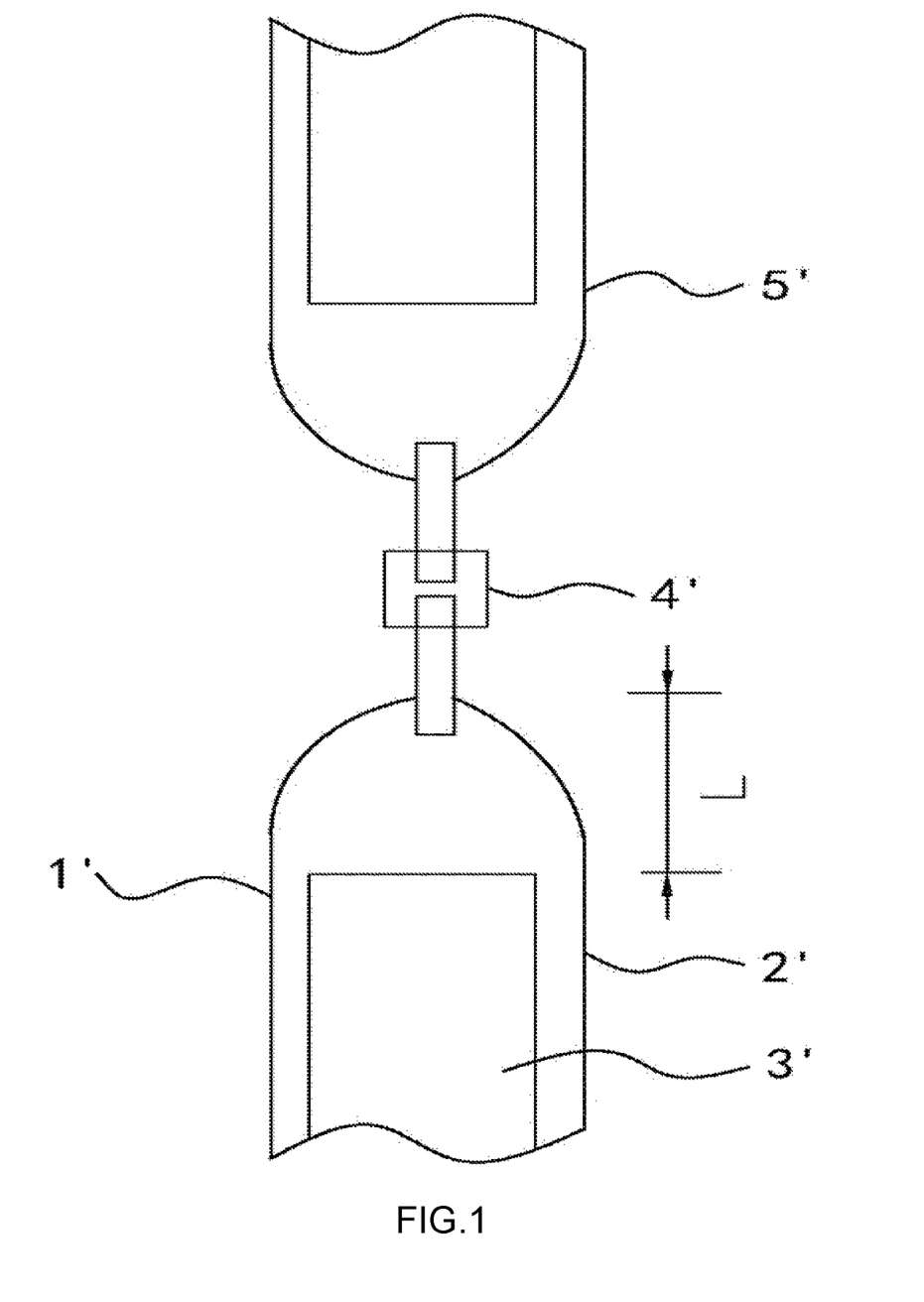
FIG. 1 is a schematic view showing the structure of the connecting portion between the bag body and the bag cover of a convention thermal bag.

The present invention relates to a thermal bag which belongs to the fields of cold chain logistics, product preservation, heat retaining, constant-temperature preservation and so forth There are two types of thermal bags, namely hard thermal bags and soft thermal bags. A soft thermal bag generally comprises a bag body and a bag cover which are movably connected. The bag body comprises an inner bag, an outer bag and a thermal layer. The inner bag has a top opening and a receiving cavity with certain capacity. The outer bag has a top opening and a receiving cavity which is bigger than that of the inner bag. The thermal layer is disposed between the inner bag and the outer bag for heat isolation and thermal purposes between the inner bag and the outer bag. The thermal layer has a front side wall, a rear side wall, a left side wall, a right side wall and a lower side wall which are integrally connected. The bag cover comprises an upper cover, a lower cover and a thermal material layer. The outer side walls of the upper cover and the lower cover are fixedly connected. The thermal material layer of the bag cover is disposed between the upper cover and the lower cover. The bag body and the bag cover are removably connected by zipper or fastening means. Such soft thermal bags may be waterproof or non-waterproof. The parts of a non-waterproof thermal bag are generally connected by sewing; the thermal bag as a whole is more regular in shape and it is more convenient to manufacture, but it has the disadvantage of being non-waterproof. For waterproof thermal bags, the parts are required to be welded by high frequency waves. As illustrated in FIG. 1, during welding of the outer bag 1' and the inner bag 2' of the bag body, as the thermal layer 3' has a certain thickness, it is not possible to weld close to the thermal layer, so that welding has to be performed at a certain distance L from an upper surface of the thermal layer. When the bag cover 5' covers the bag body, as the zipper 4' and the portion under the distance L both have poor load bearing strength, the bag body as a whole is not regular in shape; besides, as the portion under the distance L does not have any thermal capacity, heat exchange between the zipper 4' and the portion under the distance L is greatly increased, thus significantly limiting the thermal effect. Therefore, it is necessary to further improve the thermal effect of existing thermal bags.

The technical problem of existing thermal bags is poor thermal effect.

BRIEF SUMMARY OF THE INVENTION

A thermal bag comprising a thermal bag body and a thermal bag cover; the bag cover is connected to the bag body via a connecting member in an openable manner; the bag body comprises an inner bag, an outer bag and a thermal layer between the outer bag and the inner bag; a receiving cavity is provided inside the inner bag for receiving articles to be kept warm or cold; an inner bag platform is provided corresponding to an upper portion of the thermal layer between an upper side of the inner bag and an inner side of the outer bag; an abutting platform is provided corresponding to the inner bag platform on the bag cover which abuts against the inner bag platform when the bag cover is closed.

As a preferred embodiment of the present invention, the bag cover is waterproof; the outer bag is waterproof; the inner bag is waterproof; the connecting member is a waterproof zipper; the waterproof zipper comprises an upper zipper tape, a lower zipper tape and a zipper slider disposed between the upper zipper tape and the lower zipper tape; the upper zipper tape, the lower zipper tape and the zipper slide cooperate with each other; the upper zipper tape is fixed on an lower peripheral edge of the bag cover; the lower zipper tape is fixed on an upper peripheral edge of the outer bag.

As a preferred embodiment of the present invention, the abutting platform comprises an outer bag cover in sheet form, a bag cover boundary in cylindrical form, a bag cover base, a top cover and a thermal material layer; the bag cover base and the top cover are welded at two axial ends of the bag cover boundary respectively; the thermal material layer is disposed between the bag cover base and the top cover inside the bag cover boundary; the top cover is coupled to a lower surface of the outer bag cover; the outer bag cover is fixed at an inner side of the bag cover.

As a preferred embodiment of the present invention, the outer bag cover comprises a waterproof top layer and a non-thermoplastic material layer coupled to a lower surface of the waterproof top layer; a lower surface of the non-thermoplastic material layer is coupled to an upper surface of the top cover.

As a preferred embodiment of the present invention, the inner bag comprises a cylindrical inner bag outer boundary, an inner bag top member and a cylindrical inner bag boundary; the inner bag outer boundary comprises a cylindrical outer boundary upper member, a cylindrical outer boundary lower member and a connecting groove formed between the outer boundary upper member and the outer boundary lower member; the connecting groove is disposed corresponding to the zipper; the connecting groove extends from an inner surface to an outer surface of the inner bag outer boundary; the inner bag top member is welded at an upper side of the outer boundary lower member, and a connecting hole is disposed on the inner bag top member; the connecting hole extends from an upper surface to a lower surface of the inner bag top member and communicates with the receiving cavity; an upper peripheral edge of the inner bag boundary is fixed on the lower surface of the inner bag top member; a lower peripheral edge of the inner bag boundary is provided with a thermoplastic inner bag base; a peripheral edge of the inner bag base is welded at the inner bag boundary; a thermal layer receiving cavity is formed between an outer wall of the inner bag boundary and an inner wall of the outer boundary lower member for receiving the thermal layer.

As a preferred embodiment of the present invention, the outer bag comprises a cylindrical outer bag boundary and a base welded at a lower peripheral edge of the outer bag boundary.

As a preferred embodiment of the present invention, the outer bag boundary and the bag cover are integrally formed.

As a preferred embodiment of the present invention, an upper peripheral edge of the upper zipper tape is welded on an inner wall of the bag cover; an upper portion of an outer surface of the outer boundary upper member is welded on the inner wall of the bag cover; a lower portion of the outer surface of the outer boundary upper member is welded at an inner side of the upper zipper tape; a lower peripheral edge of the lower zipper tape is welded at an inner wall of the outer bag boundary; an upper portion of an outer surface of the outer boundary lower member is welded at an inner side of the lower zipper tape; a lower portion of the outer surface of the outer boundary lower member is welded at the inner wall of the outer bag boundary.

As a preferred embodiment of the present invention, the bag cover is a TPU bag cover; the inner bag is a TPU inner bag; the outer bag is a TPU outer bag.

Advantageous Effects

In the present invention, after the bag cover of the thermal bag is closed on the bag body, the connecting member closely connect the bag cover and the bag body together; the abutting platform abuts against the inner bag platform; the position where heat exchange is higher in the thermal bag is a closed line, so that the thermal bag has better thermal and heat insulation effects while being simple in structure and convenient to manufacture.

DETAILED DESCRIPTION OF THE INVENTION

The present invention is described in detail below with a preferred embodiment, so that how the present invention overcomes the technical problem to achieve technical effects could be fully comprehended.

As illustrated in FIGS. 2-9, the present embodiment discloses a method for manufacturing thermal bag which comprises the following steps:

a. Prepare a thermal bag cover 1;
b. Prepare a thermal bag inner bag 2;
c. Prepare a thermal bag outer bag 3;
d. Sleeve a thermal layer 5 onto the thermal bag inner bag 2 and then position the same inside the thermal bag outer bag 3; then weld an upper side edge of the thermal bag inner bag 2 and the thermal bag outer bag 3 together;
e. Fix the thermal bag cover 1 and an upper side edge of the thermal bag outer bag 3 by glue and then perform welding to obtain the thermal bag.

In the above steps, the steps a, b, c may be performed in any order or performed simultaneously.

Figure 2:
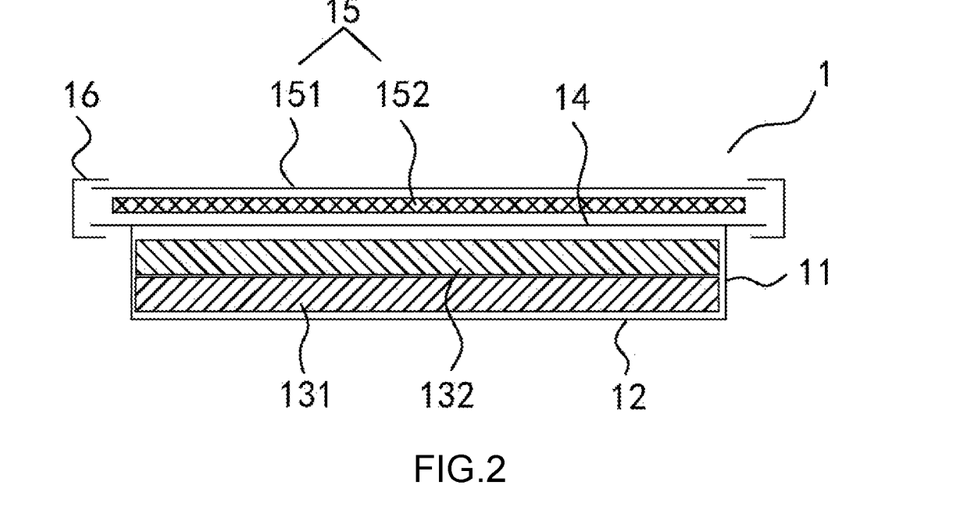
FIG. 2 is a schematic sectional view of the bag cover of the embodiment of the present invention.

As illustrated in FIG. 2, the step a comprises the following steps:

a1. Weld two vertical side edges of a rectangular TPU fabric together to obtain a bag cover boundary 11 for the thermal bag cover 1;

a2. Cover a TPU fabric on a horizontal side of the bag cover boundary 11 and perform welding to obtain a bag cover base 12;

a3. Insert a first thermal material layer 131 and a second thermal material layer 132 into the bag cover boundary 11 of the product obtained in step a2; the first thermal material layer 131 and the second thermal material layer 132 comprise thermal cotton of different thermal capacities.

a4. Cover another TPU fabric 14 on top of the second thermal material layer 132 and weld together with the bag cover boundary 11 to form one piece; the aforementioned TPU fabric 14 forms the top cover of the present invention.

a5. Fixedly connect the product obtained in step a4 and an outer bag cover 15 in sheet form to form one piece. The outer bag cover 15 has a top surface formed by a TPU fabric 151. The outer bag cover 15 has a lower surface which is coupled with a non-thermoplastic material layer 152. The non-thermoplastic material layer 152 is mainly used for ensuring the strength of the thermal bag cover 1. Therefore, the said fixed connection is done by fixedly connecting the product obtained in step a4 and an outer side edge of the outer bag cover 15 to form one piece by sewing.

a6. Wrap a layer of TPU fabric 16 around an outer side edge of the product obtained in step a5 and perform welding to obtain the thermal bag cover 1. In this way, the thermal bag cover 1 has waterproof capacity. Certainly, in step a5, it is also possible to fixedly connect the product obtained in step a4 and the outer bag cover to form one piece by glue; however, such fixed connection may encounter layer detachment as time passes. Therefore, although the edge wrapping process of a6 is saved, the product capacity is also compromised and falls into the scope of a defective invention. During actual manufacturing process, when the thermal bag cover closes on the inner bag, the upper surface of the thermal bag cover has a height which is slightly greater than the height of the outer bag, so that when closing by the zipper, the lower surface of the thermal bag cover and the upper side edge of the inner bag could be closed tightly, thereby reducing the contact area with the air and limiting heat loss to the greatest extent. The outer bag cover 15, the bag cover boundary 11, the bag cover base 12, the TPU fabric 14 and the thermal material layer 132 forms the abutting platform 100.

Figure 3:
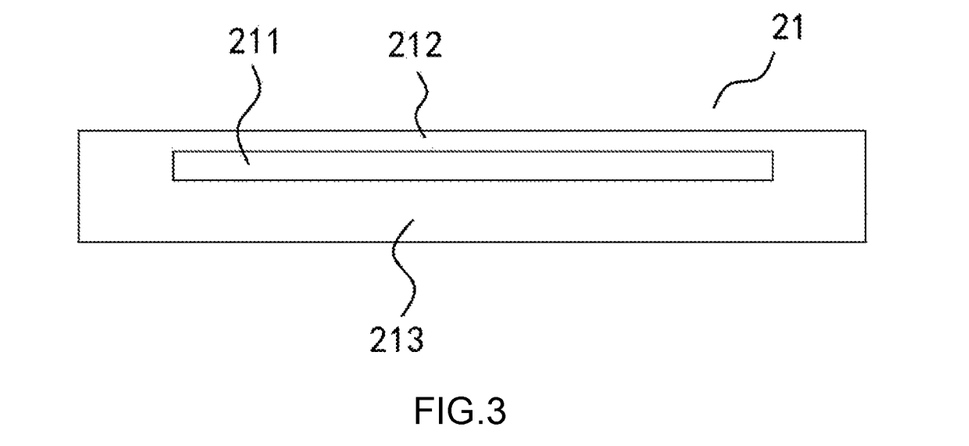
FIG. 3 is a schematic view showing the structure of the inner bag outer boundary in an extended state in the embodiment of the present invention.
Figure 4:
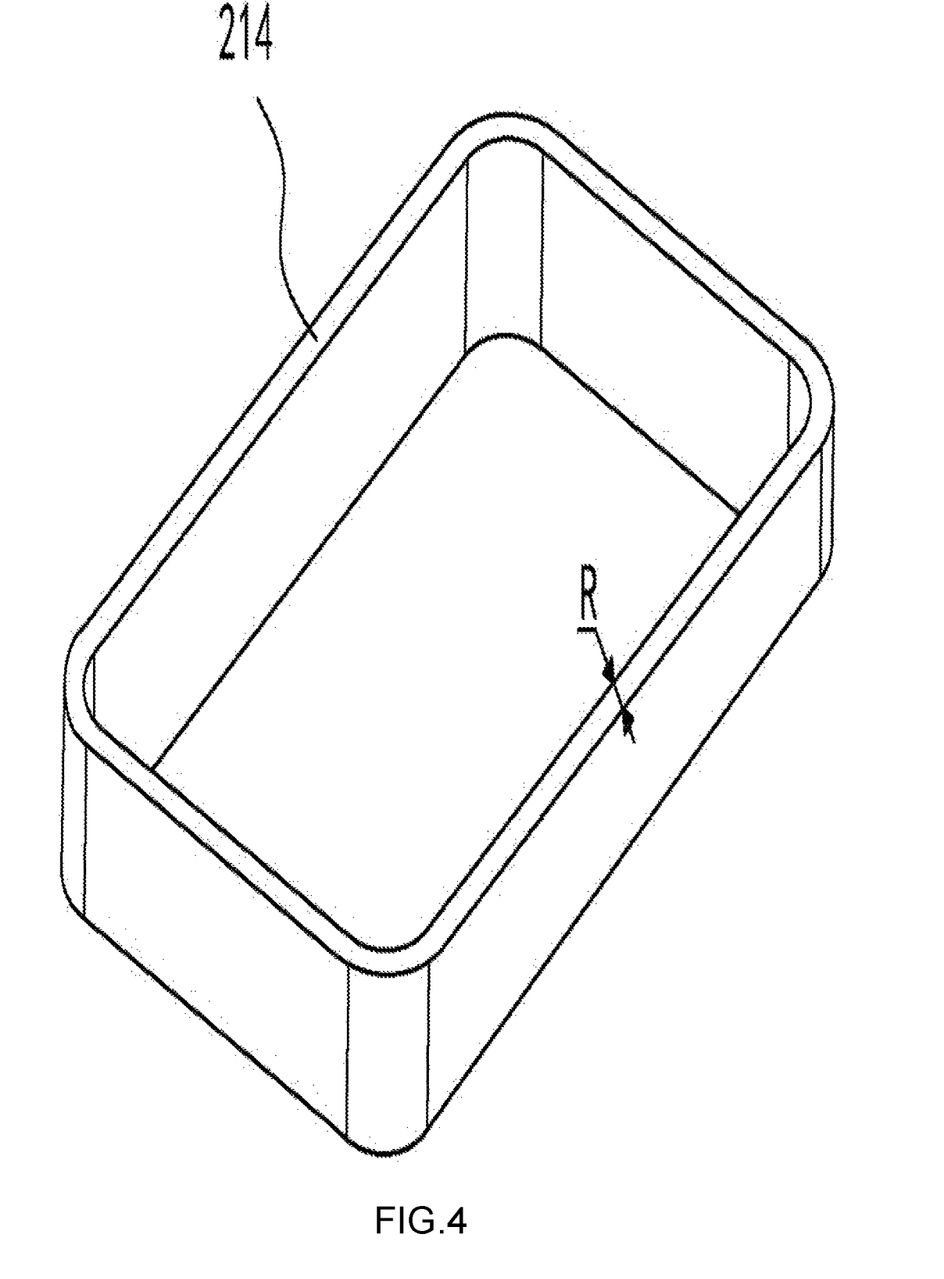
FIG. 4 is a schematic view showing the structure of the mold 214 of the embodiment of the present invention.
Figure 5:
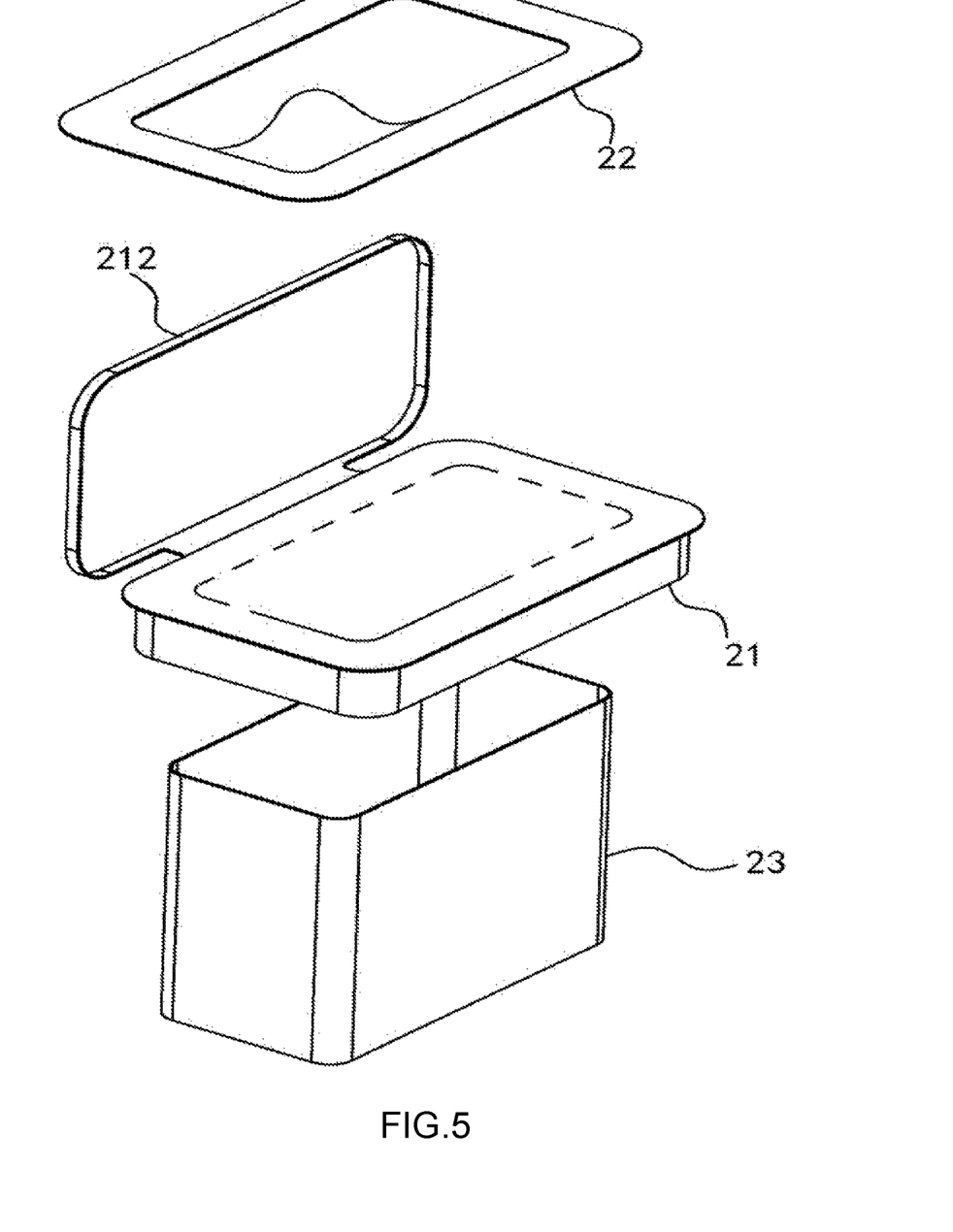
FIG. 5 is a perspective disassembling view of the inner bag of the embodiment of the present invention.
Figure 6:
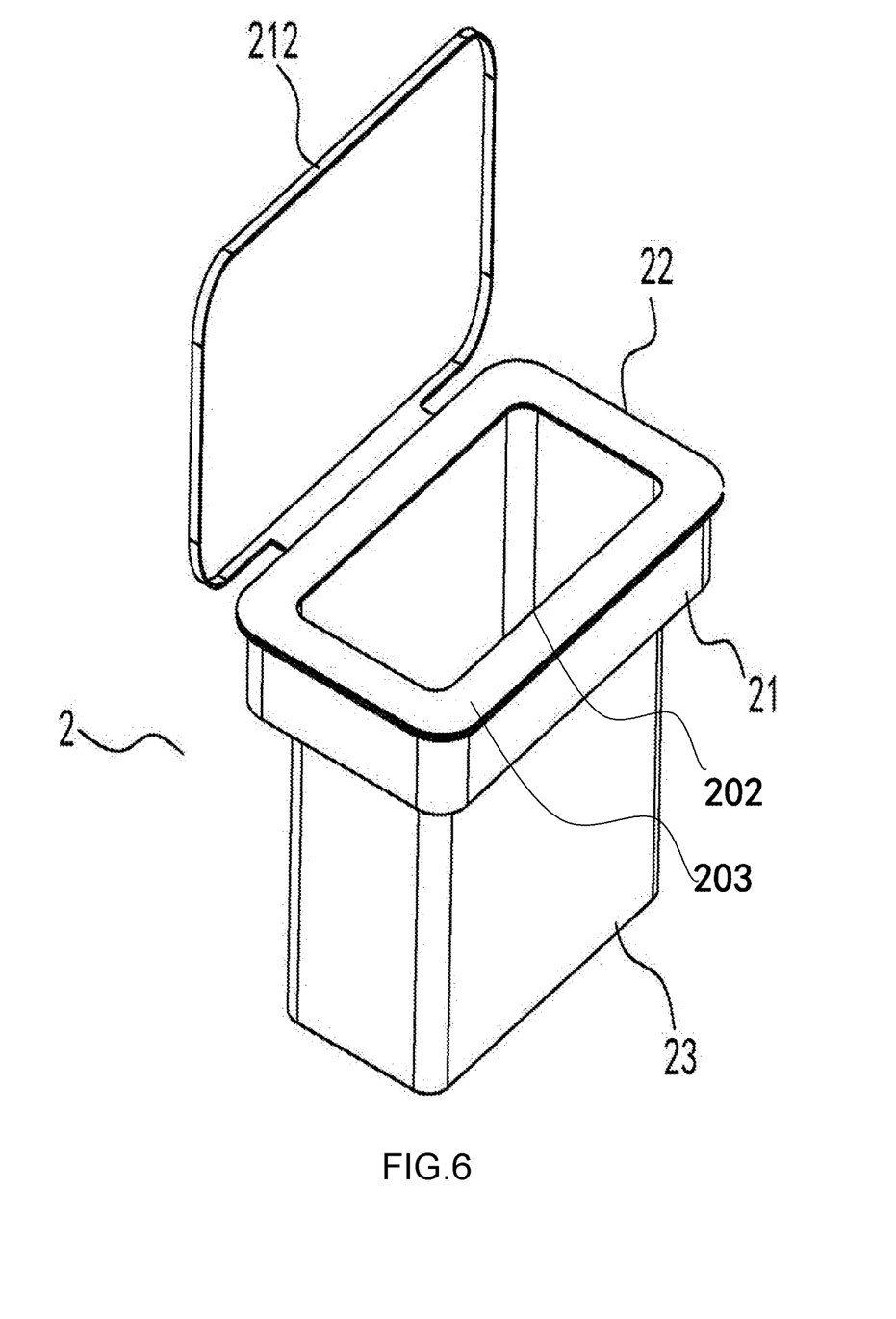
FIG. 6 is a perspective view of the inner bag of the embodiment of the present invention.
Figure 7:
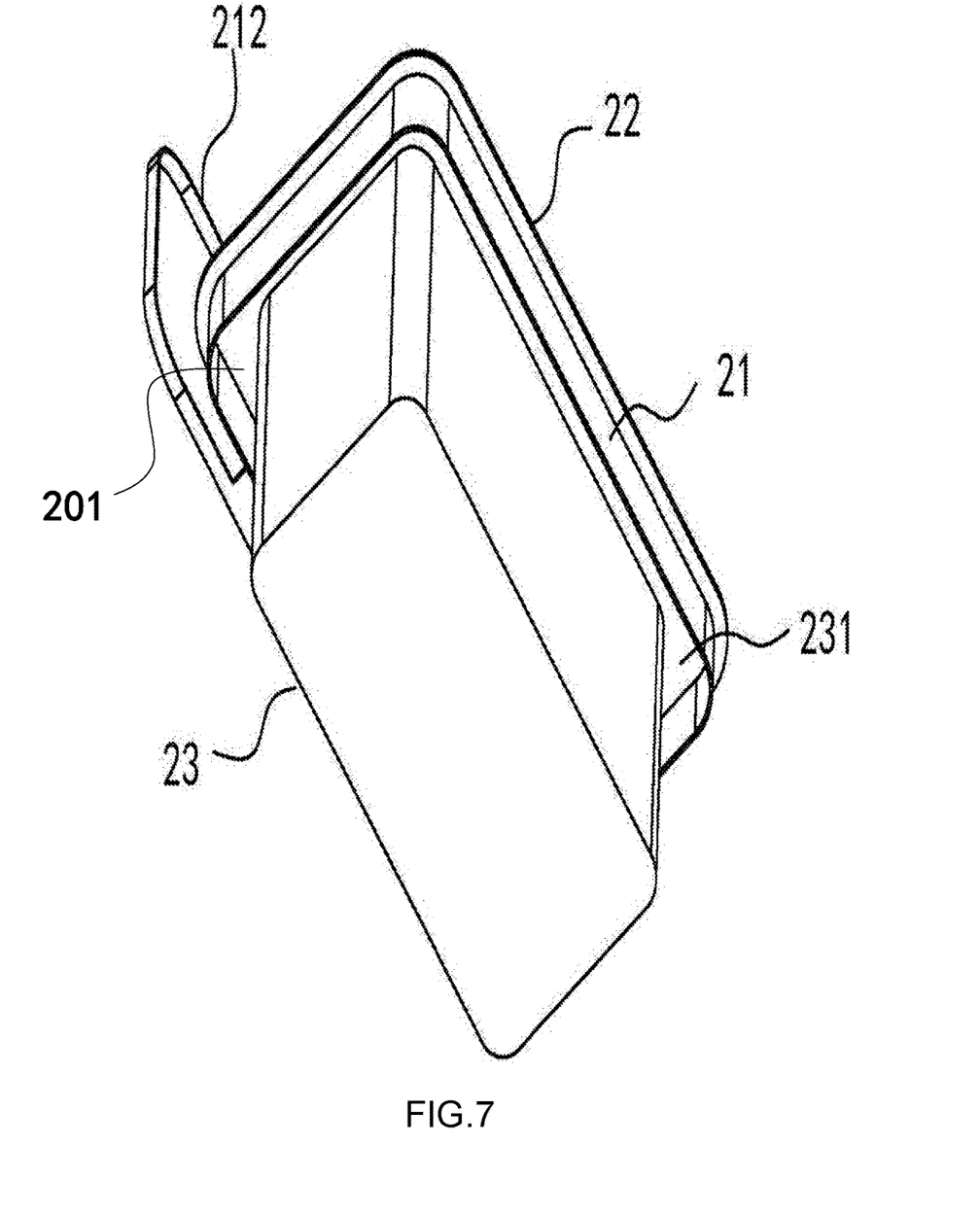
FIG. 7 is another perspective view of the inner bag of the embodiment of the present invention.
Figure 8:
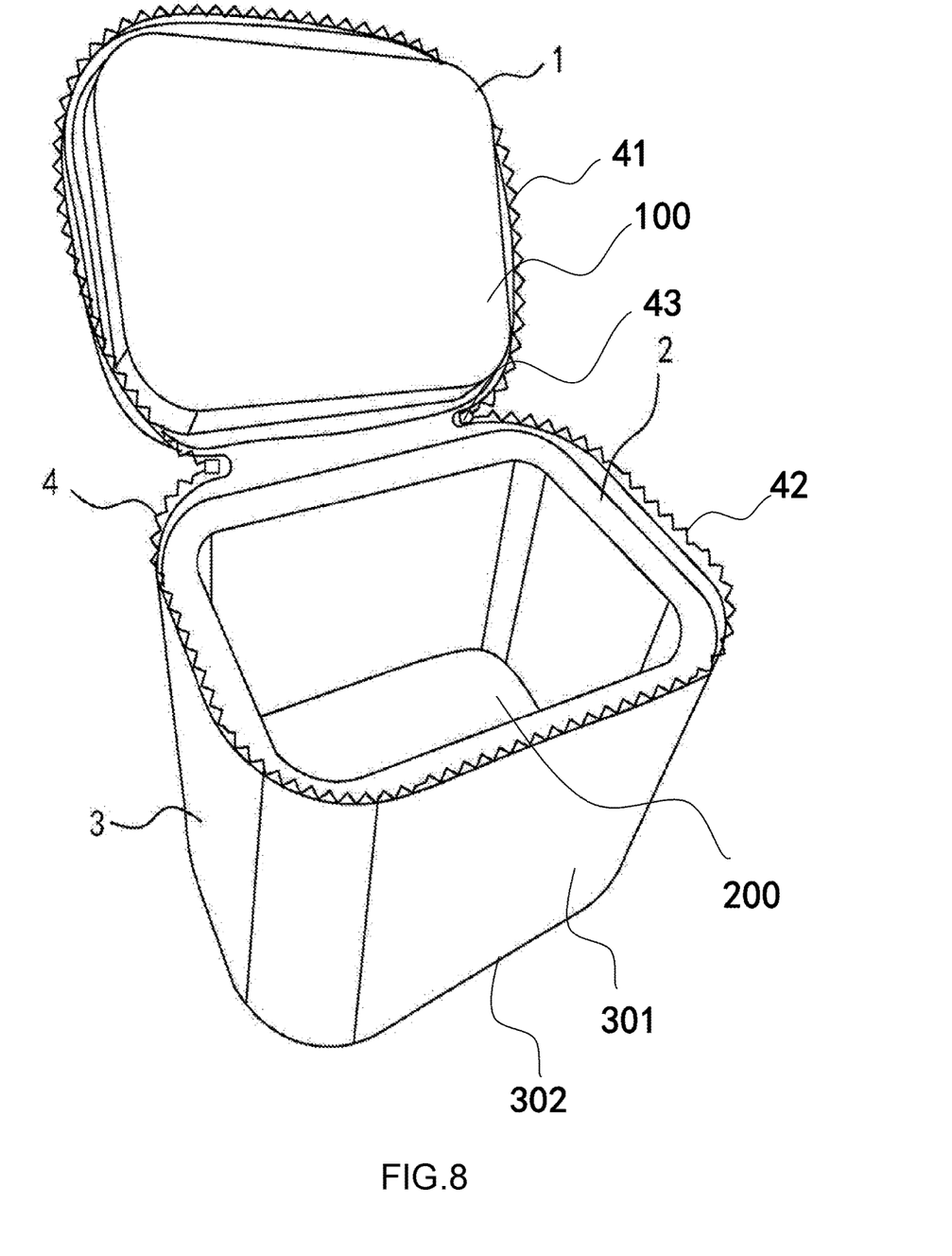
FIG. 8 is a perspective view of the thermal bag manufactured according to the embodiment of the present invention.
Figure 9:
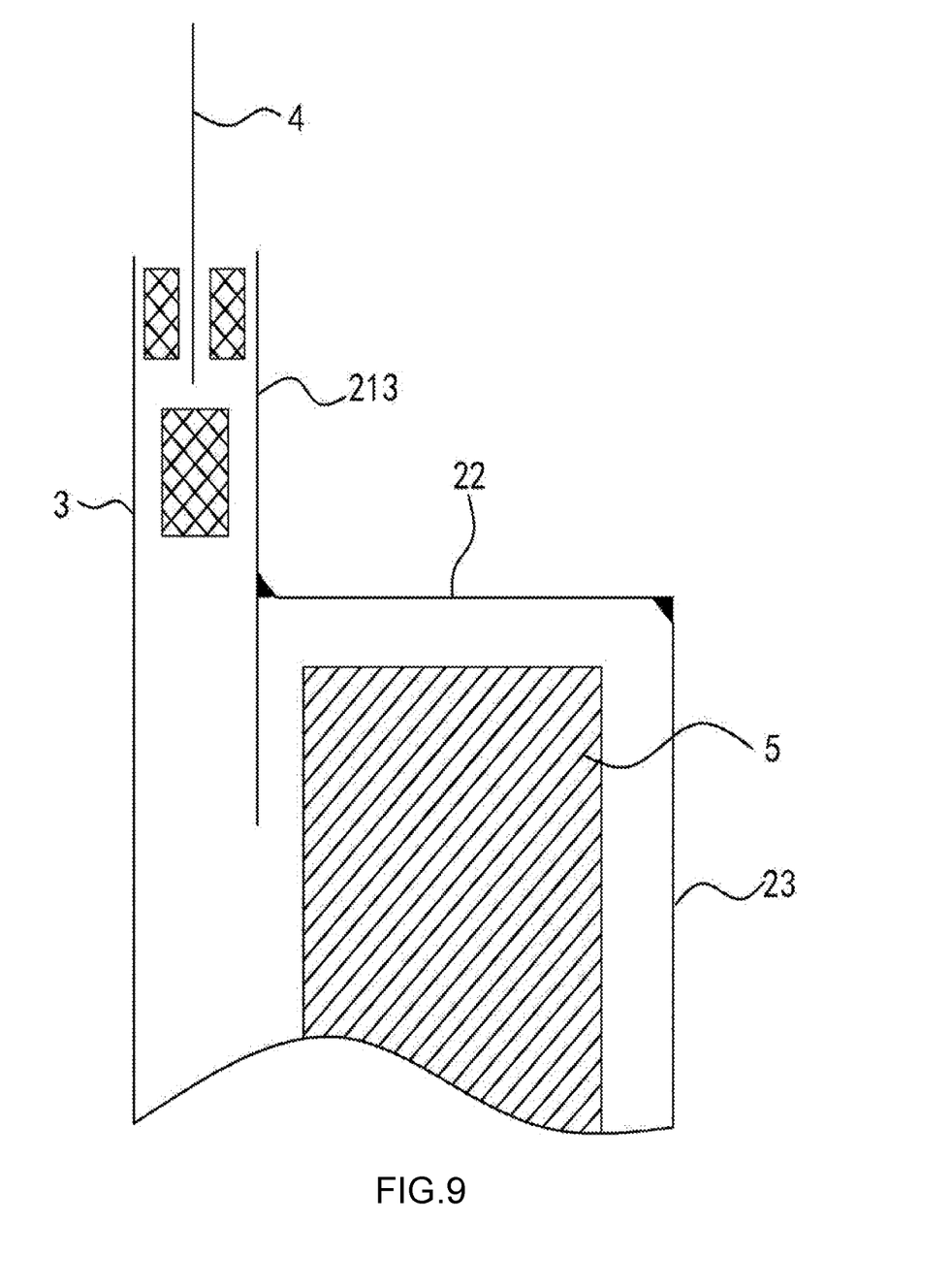
FIG. 9 is a schematic view showing the welding structure of the thermal bag outer bag and the thermal bag inner bag of the embodiment of the present invention.

As illustrated in FIGS. 3 to 7, the step b comprises the following steps:

b1. Open a zipper groove 211 along a lengthwise direction on a rectangular thermoplastic fabric, and then weld two vertical side edges of the fabric together to obtain an inner bag outer boundary 21. The aforementioned zipper groove 211 forms the connecting groove of the present invention. The inner bag outer boundary 21 comprises an outer boundary upper member 212 above the zipper groove 211 and an outer boundary lower member 213 below the zipper groove 211 (as illustrated in FIG. 3);

b2. Pass the inner bag outer boundary 21 through an inner side of a mold 214 (as illustrated in FIG. 4) with a side of the outer boundary lower member 213 which is close to the zipper groove 211 folded outwards on an outer side of the mold 214; cover an inner bag top member 22 above the outer boundary lower member 213 and perform welding. The mold 214 has a hollow annular structure. The mold 214 has a thickness R which is the welding thickness (as illustrated in FIG. 5);

b3. Weld two lengthwise side edges of another rectangular TPU fabric together to obtain an inner bag boundary 23 for the thermal bag inner bag (as illustrated in FIG. 5);

b4. Pass an upper side edge of the inner bag boundary 23 along an inner side of a second mold and fold outwards on an outer side of the second mold; weld the inner bag top member 22 of the product obtained in step b2 and the inner bag boundary 23 together. At this time, the outer boundary lower member 213 and the inner bag boundary 23 are respectively positioned on the same side of the inner bag top member 22. The second mold has a structure similar to that of the mold 214, except that the second mold has a smaller circumferential length than that of the mold 214, thereby forming a receiving cavity 231 between the outer boundary lower member 213 and the inner bag boundary 23. The receiving cavity 231 is used for filling in the thermal layer 5 (as illustrated in FIG. 7).

b5. Cut away the portion covered by the inner bag boundary 23 on the inner bag top member 22 of the product obtained in step b4 (as illustrated by broken lines in FIG. 5) to obtain a structure as illustrated in FIG. 6; a connecting hole 202 is formed above the inner bag top member 22; the upper surface of the inner bag top member 2 forms the inner bag platform 203 of the present invention.

b6. Cover a thermoplastic fabric on the lower side edge of the inner bag boundary 23 of the product obtained in step b5 and perform welding to obtain an integral thermal bag inner bag 2, a receiving cavity 200 is formed in the inner bag 2 for receiving the articles to be kept warm or cold.

The step c comprises the following steps:

c1. Cut a rectangular TPU fabric to obtain an outer bag boundary 301 for the thermal bag outer bag, and blank out a zipper groove thereon;

c2. Sew outer bag accessories on a thermoplastic small fabric, and then weld the thermoplastic small fabric on the outer bag boundary 301; at the same time, weld two zipper tapes of a waterproof zipper on upper and lower sides of the zipper groove of the outer bag boundary 301 respectively; the waterproof zipper 41 comprises an upper zipper tape 41, a lower zipper tape 42 and a zipper slider 43 disposed between the upper zipper tape 41 and the lower zipper tape 42.

c3. Weld two vertical side edges of the outer bag boundary 301 together;

c4. Fix the bag base 302 with a lower side edge of the outer bag boundary 301 by glue and then weld together to form one piece;

After step c3 or c4, it optionally comprises a step of welding the thermoplastic small fabric. The thermoplastic small fabric is sewed with various accessories of the thermal bag thereon.

The steps c1 to c4 are well known in the art.

The step d comprises the following steps:

Sleeve the thermal layer 5 into the receiving cavity 231 of the thermal bag inner bag 2. More specifically, the upper side edge of the thermal layer 5 is embedded with interference fit in-between the inner bag boundary 23 and the inner bag outer boundary 21 under the inner bag top member 22 (a receiving cavity 201 for receiving the thermal layer 5 is formed between an outer wall of the inner bag boundary 23 and an inner wall of the outer boundary lower member 213). The thermal layer 5 and the thermal bag inner bag 2 are then as a whole positioned inside the thermal bag outer bag 3. The waterproof zipper 4 is then opened, and the upper side edge of the outer boundary lower member 213 is then welded together simultaneously with the inner side of the outer bag boundary 301 and the zipper tape below the outer bag boundary 301 zipper groove, and the outer boundary upper member 212 as a whole is welded on the outer bag boundary 301 and the zipper tape above the outer bag boundary 301 zipper groove. In the present embodiment, the outer boundary lower member 213 is simultaneously welded with the outer side of the outer bag boundary 301 and the zipper tape because the welding portion of the upper side edge of the outer boundary lower member 214 crosses the welding portion where the zipper tape is welded below the zipper groove at the inner side of the outer bag boundary 301, the same applies to the outer boundary upper member 212.

In the present invention, the thermal layer 5 is formed by polyurethane foam sponge or EVA foam which are commonly known in the art. When it serves as the thermal heat insulated layer between the thermal bag inner bag 2 and the thermal bag outer bag 3, the material source and manufacturing method thereof are all known in the art. Therefore, the lack of detailed disclosure in the present invention does not imply that there is no such manufacturing step. The thermoplastic fabric may be TPU and its composite fabric, or PVC and its composite fabric.

In the disclosure of the present invention, in the manufacturing process, the thermal bag comprises the thermal bag outer bag, the thermal bag inner bag, the thermal bag cover, the thermal layer, the thermal material layer and so forth. However, after manufacture of the thermal bag is complete, each of the aforementioned components are welded or fixedly connected to form one piece. At this time, the waterproof zipper forms the division point between each of the aforementioned components, and the thermal bag at this time comprises the bag body and the bag cover. Slight differences between the naming of the components before and after manufacture are normal, and would not cause deviations or obstacles to the comprehension of the present invention.

What is claimed is:

1. A thermal bag comprising a thermal bag body and a thermal bag cover; the bag cover is connected to the bag body via a connecting member in an openable manner; the bag body comprises an inner bag, an outer bag and a thermal layer between the outer bag and the inner bag; a receiving cavity is provided inside the inner bag for receiving articles to be kept warm or cold, characterized in that: an inner bag platform is provided corresponding to an upper portion of the thermal layer between an upper side of the inner bag and an inner side of the outer bag; an abutting platform is provided corresponding to the inner bag platform on the bag cover which abuts against the inner bag platform when the bag cover is closed; the bag cover is waterproof; the outer bag is waterproof; the inner bag is waterproof; the connecting member is a waterproof zipper; the waterproof zipper comprises an upper zipper tape, a lower zipper tape and a zipper slider disposed between the upper zipper tape and the lower zipper tape; the upper zipper tape, the lower zipper tape and the zipper slide cooperate with each other; the upper zipper tape is fixed on an lower peripheral edge of the bag cover; the lower zipper tape is fixed on an upper peripheral edge of the outer bag; the inner bag comprises a cylindrical inner bag outer boundary, an inner bag top member and a cylindrical inner bag boundary; the inner bag outer boundary comprises a cylindrical outer boundary upper member, a cylindrical outer boundary lower member and a connecting groove formed between the outer boundary upper member and the outer boundary lower member; the connecting groove is disposed corresponding to the zipper; the connecting groove extends from an inner surface to an outer surface of the inner bag outer boundary; the inner bag top member is welded at an upper side of the outer boundary lower member, and a connecting hole is disposed on the inner bag top member; the connecting hole extends from an upper surface to a lower surface of the inner bag top member and communicates with the receiving cavity; an upper peripheral edge of the inner bag boundary is fixed on the lower surface of the inner bag top member; a lower peripheral edge of the inner bag boundary is provided with a thermoplastic inner bag base; a peripheral edge of the inner bag base is welded at the inner bag boundary; a thermal layer receiving cavity is formed between an outer wall of the inner bag boundary and an inner wall of the outer boundary lower member for receiving the thermal layer.

2. The thermal bag as in claim 1, characterized in that: the abutting platform comprises an outer bag cover in sheet form, a bag cover boundary in cylindrical form, a bag cover base, a top cover and a thermal material layer; the bag cover base and the top cover are welded at two axial ends of the bag cover boundary respectively; the thermal material layer is disposed between the bag cover base and the top cover inside the bag cover boundary; the top cover is coupled to a lower surface of the outer bag cover; the outer bag cover is fixed at an inner side of the bag cover.

3. The thermal bag as in claim 2, characterized in that: the outer bag cover comprises a waterproof top layer and a non-thermoplastic material layer coupled to a lower surface of the waterproof top layer; a lower surface of the non-thermoplastic material layer is coupled to an upper surface of the top cover.

4. The thermal bag as claim 3, characterized in that: the bag cover is a TPU bag cover; the inner bag is a TPU inner bag; the outer bag is a TPU outer bag.

5. The thermal bag as claim 2, characterized in that: the bag cover is a TPU bag cover; the inner bag is a TPU inner bag; the outer bag is a TPU outer bag.

6. The thermal bag as in claim 1, characterized in that: the outer bag comprises a cylindrical outer bag boundary and a base welded at a lower peripheral edge of the outer bag boundary.

7. The thermal bag as in claim 6, characterized in that: the outer bag boundary and the bag cover are integrally formed.

8. The thermal bag as in claim 7, characterized in that: an upper peripheral edge of the upper zipper tape is welded on an inner wall of the bag cover; an upper portion of an outer surface of the outer boundary upper member is welded on the inner wall of the bag cover; a lower portion of the outer surface of the outer boundary upper member is welded at an inner side of the upper zipper tape; a lower peripheral edge of the lower zipper tape is welded at an inner wall of the outer bag boundary; an upper portion of an outer surface of the outer boundary lower member is welded at an inner side of the lower zipper tape; a lower portion of the outer surface of the outer boundary lower member is welded at the inner wall of the outer bag boundary.

9. The thermal bag as claim 8, characterized in that: the bag cover is a TPU bag cover; the inner bag is a TPU inner bag; the outer bag is a TPU outer bag.

10. The thermal bag as claim 7, characterized in that: the bag cover is a TPU bag cover; the inner bag is a TPU inner bag; the outer bag is a TPU outer bag.

11. The thermal bag as claim 6, characterized in that: the bag cover is a TPU bag cover; the inner bag is a TPU inner bag; the outer bag is a TPU outer bag.

12. The thermal bag as in claim 1, characterized in that: the bag cover is a TPU bag cover; the inner bag is a TPU inner bag; the outer bag is a TPU outer bag.

* * * * *